United States Patent [19]

Neuhalfen

[11] Patent Number: 4,750,467
[45] Date of Patent: Jun. 14, 1988

[54] INTERNAL COMBUSTION ENGINE IGNITION SYSTEM

[75] Inventor: Michael A. Neuhalfen, Galveston, Ind.

[73] Assignee: General Motors Corporation, Detroit, Mich.

[21] Appl. No.: 940,613

[22] Filed: Dec. 10, 1986

Related U.S. Application Data

[63] Continuation-in-part of Ser. No. 905,656, Sep. 11, 1986, abandoned.

[51] Int. Cl.[4] ............................................. F02P 1/00
[52] U.S. Cl. .................................... 123/644; 123/621; 123/611
[58] Field of Search .............. 123/644, 609, 611, 621; 315/209 T

[56] References Cited

U.S. PATENT DOCUMENTS

| | | | |
|---|---|---|---|
| 3,575,154 | 4/1971 | Taylor | 123/644 |
| 3,605,713 | 9/1971 | Le Masters et al. | 123/644 |
| 3,937,193 | 2/1976 | Kim | 123/611 |
| 3,980,922 | 9/1976 | Katsumata et al. | 123/621 |
| 4,121,556 | 10/1978 | Bigliani et al. | 123/644 |
| 4,176,645 | 12/1979 | Jundt et al. | 123/644 |
| 4,196,711 | 4/1980 | Daumer | 123/644 |
| 4,402,299 | 9/1983 | Nakao et al. | 123/644 |
| 4,411,246 | 10/1983 | Sugiura | 123/611 |
| 4,434,779 | 3/1984 | Yamamoto et al. | 123/611 |

*Primary Examiner*—Raymond A. Nelli
*Attorney, Agent, or Firm*—C. R. Meland

[57] ABSTRACT

An ignition system for a distributorless internal combustion engine ignition system. Parameters related to the energization of a given ignition coil are stored and later utilized to control the dwell time for this same ignition coil. Another coil is energized and deenergized between the storing of parameters and the subsequent use of the parameters that relate to the given coil. The system causes a spark plug to be fired when a calculated spark timing signal is developed or at a time delayed from the occurrence of the calculated spark timing signal. Delayed spark plug firing occurs when certain conditions are not met prior to the time the calculated spark timing signal occurs. One of these conditions is that primary winding current has not attained a current limit value prior to the time that the calculated spark timing signal occurs.

5 Claims, 4 Drawing Sheets

INTERNAL COMBUSTION ENGINE IGNITION SYSTEM

This application is a Continuation-in-Part of application Ser. No. 905,656 filed on Sept. 11, 1986, now abandoned.

This invention relates to an electronic ignition system for an internal combustion engine and more particularly to an electronic ignition system that is capable of controlling both the spark timing and primary current dwell time of a distributorless ignition system.

In an electronic ignition system a semiconductor switch is connected in series with the primary winding of an ignition coil. When the semiconductor switch is conductive the primary winding is energized and when the semiconductor switch is biased nonconductive an ignition spark is developed in the secondary winding of the coil. The time at which the primary winding is energized is sometimes termed the start of dwell SOD and the time at which the primary winding coil is cutoff is sometimes termed as end of dwell EOD. The time period between EOD and SOD is the "off" time of the semiconductor switch and is sometimes referred to as the anti-dwell period. The EOD point should occur at the desired spark timing point to initiate ignition while the SOD point should be chosen relative to the EOD point that sufficient energy is developed in the coil to fire a spark plug. The time period between SOD and EOD is called the dwell time and corresponds to the time period that the primary winding is energized. The system should be arranged so that this dwell time is sufficient to provide enough energy out of the ignition coil to reliably fire a spark plug. On the other hand, with a semiconductor switch controlling primary winding current the semiconductor switch must be biased into a current limiting mode in order to limit primary winding current to a safe value.

It has been recognized in the prior art that dwell time can be controlled by measuring primary winding current and then developing a signal that varies the anti-dwell time so as to maintain a certain level of current for the primary winding. One such type of system is disclosed in the U.S. Pat. No. 3,605,713 to LeMasters et al. In that patent a small resistor senses primary winding current and places the output transistor in a current limit mode when the current limit magnitude is reached. The system further controls the anti-dwell time and through closed loop action tends to provide an ultimate primary winding current magnitude that is substantially equal to the current limit value. Other arrangements for controlling dwell time as a function of measured primary winding current are disclosed in the U.S. Pat. No. 4,367,722 to Mizuno and to Pagel et al. U.S. Pat. No. 4,198,936. In Mizuno the ramp time of the primary winding current is detected and utilized to control anti-dwell time. In Pagel et al. a counter has pulses applied thereto during the ramp time of the primary winding current and the pulses so counted are utilized subsequently to control the anti-dwell time.

Distributorless ignition systems which control dwell time are also known. One example of this is the U.S. Pat. No. 4,378,779 to Hachiga et al. In this patent plural ignition coil primary windings are utilized and a single current measuring resistor measures the current supplied respectively to the primary windings. Another patent which relates to a distributorless ignition system that has dwell control is the U.S. Pat. No. 4,265,211 to Meloeny.

The present invention measures primary winding current in each of a plurality of ignition coils in order to control a anti-dwell period. However, in contrast to the system shown in Hachiga et al. the system of this invention measures the primary winding current for a given coil and then controls the anti-dwell time of this same coil in an arrangement wherein another coil is energized between energizations of the given coil. In Hachiga et al. the current is measured in one coil and is then utilized to control the anti-dwell period for the next coil to be energized. Thus, the Hachiga et al. arrangement does not take into account the fact that the resistance and inductance of the coils may not be matched. With the arrangement of this invention data is collected for a given coil and is then not utilized until the time for controlling the anti-dwell period of this same coil.

Accordingly it is an object of this invention to provide a dwell control for a distributorless ignition system wherein primary winding current data is collected for a given coil and then is subsequently used to control the anti-dwell period for the same coil.

Another object of this invention is to provide a dwell control system wherein the ramp time of the primary winding current is measured and wherein one of a plurality of current limit times are selected as a function of the ramp time. The current limit time that is selected is utilized to control an anti-dwell period and the system is arranged such that the current limit time selected is of such a value as to cause the dwell time to be long enough to cause primary winding current to attain a current limit value.

Still another object of this invention is to provide an ignition system that has a dwell control arrangement which is under certain conditions of operation operates to extend the EOD point from a calculated EOD point. The conditions of operation which determine whether or not the EOD is extended are:

A. A determination of whether or not the primary winding current has reached its current limit value when the EOD signal occurs;

B. Determining whether the ramp time of the primary current has exceeded a certain time value; and C. Whether or not the SOD signal has occurred during a minimum burn time or "off" time of the semiconductor switch that controls primary winding current.

By extending the EOD point from the calculated EOD point the dwell time is increased to assure sufficient coil energy to fire a plug. The extending of the EOD point may be caused, for example, by a sudden change in spark timing or by sudden engine acceleration.

Another object of this invention is to provide a dwell control system which operates to increase a subsequent occurring dwell time when the system operates to extend EOD from the calculated EOD.

IN THE DRAWINGS

Figure 1:
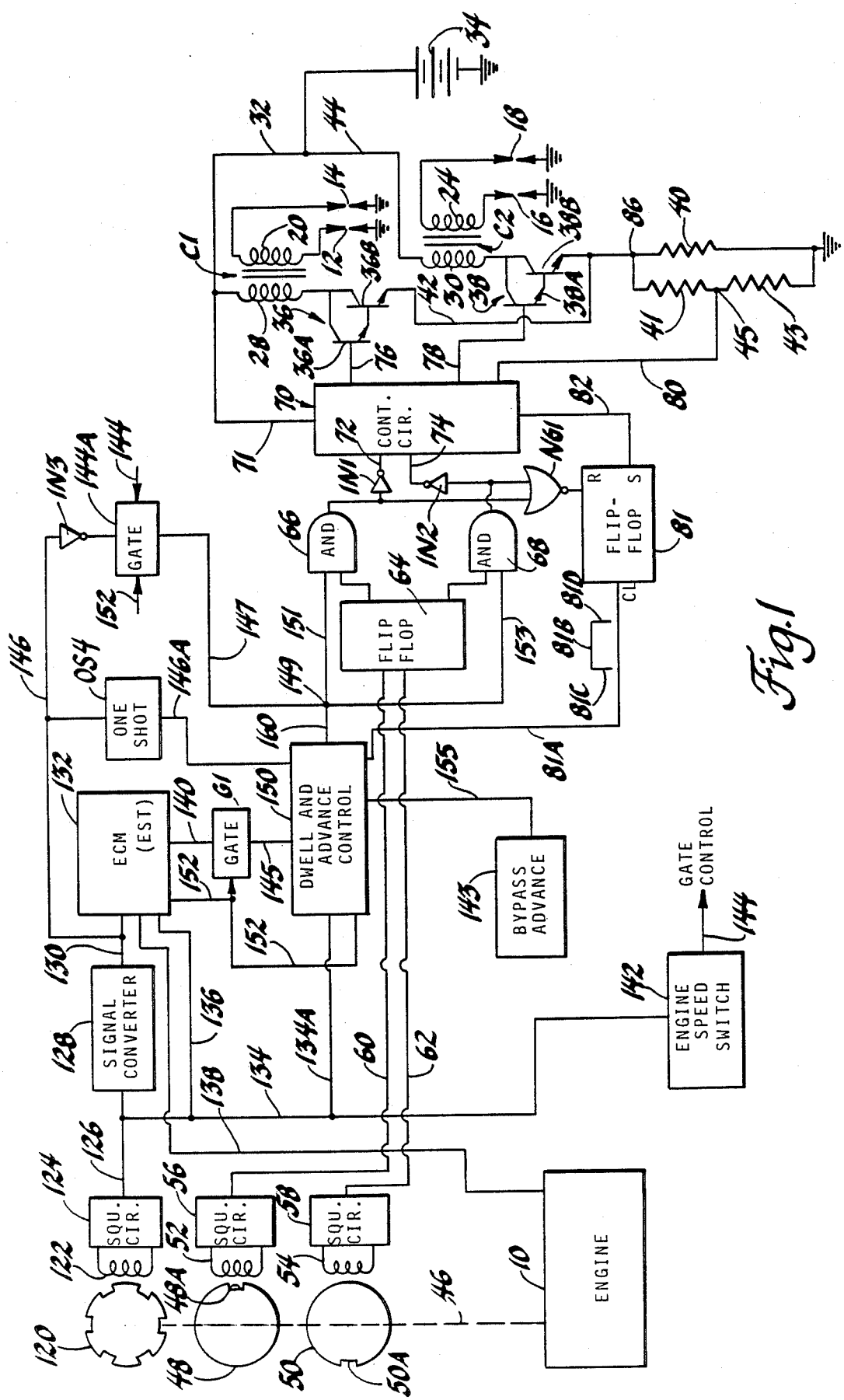
FIG. 1 illustrates an internal combustion engine ignition system made in accordance with this invention.

Referring now to the drawings, and more particularly to FIG. 1, the reference numeral 10 designates a four cycle internal combustion engine. In the description of this invention the engine 10 will be considered to be a 4 cylinder engine having a firing order 1-3-4-2. The reference numerals 12 and 14 designate spark plugs which are respectively associated with cylinders 1 and 4 of the engine 10. The reference numerals 16 and 18 designate spark plugs that are respectively associated with cylinders 2 and 3 of the engine 10.

The ignition system of this invention is a so-called distributorless ignition system in that it does not utilize the conventional rotor and distributor cap contacts for sequentially distributing spark firing energy to the spark plugs of the engine. To this end, the spark plugs 12 and 14 are connected to the secondary winding 20 of an ignition coil C1 and the spark plugs 16 and 18 are connected to the secondary winding 24 of an ignition coil C2. The ignition coil C1 has a primary winding 28 and the ignition coil C2 has a primary winding 30. One side of the primary windings 28 and 30 are connected to a conductor 32 which in turn is connected to the positive side of direct voltage source 34, which is illustrated as a battery. The negative side of source 34 is grounded and the source 34 may be the storage battery on a motor vehicle which is connected to a battery charging generator (not illustrated). The generator also supplies the electrical loads on the motor vehicle including the ignition system in a manner well known to those skilled in the art.

The ignition system comprises two semiconductor switches that take the form of Darlington connected transistors 36 and 38. Darlington transistor 36 is comprised of NPN transistors 36A and 36B and Darlington transistor 38 is comprised of NPN transistors 38A and 38B. The transistors 36 and 38 are respectively connected in series with the primary windings 28 and 30 and in series with a current sensing resistor 40 which has a low resistance value, for example of 0.047 ohms. A resistive voltage divider is connected across resistor 40 comprised of resistors 41 and 43 that have a junction or node 45. The resistors 41 and 43 have resistance values which may be in a range of about 19 to 35 ohms. The resistors 41 and 43 are laser trimmed to predetermined resistance values for the purpose to be described hereinafter. When the Darlington connected transistor 36 is biased conductive a current path can be traced from conductor 32, through primary winding 28, through the Darlington connected transistor 36, through conductor 42 and then through resistor 40 to ground. When the Darlington connected transistor 38 is biased conductive a current path can be traced from conductor 44, through primary winding 30, through the conductive Darlington connected transistor 38 and then through resistor 40 to ground. It will be evident that when a Darlington connected transistor 36 is biased nonconductive a high voltage will be induced in secondary winding 20 which will cause spark plugs 12 and 14 to be fired in series. In a similar fashion when Darlington connected transistor 38 is biased nonconductive a high voltage will be induced in secondary winding 24 to cause the spark plugs 16 and 18 to be fired in series.

It will be evident from the foregoing that two spark plugs, corresponding to two cylinders of the engine, are fired in series each time that a respective Darlington connected transistor is biased nonconductive. The system is arranged such that when a spark plug, associated with a cylinder that is in its compression stroke, is fired another plug associated with a cylinder that is in its exhaust stroke is simultaneously fired. Thus, if the piston of the cylinder associated with spark plug 12 is in its compression stroke the piston of the cylinder associated with spark plug 14 will be in its exhaust stroke and vice versa. The same holds true for the cylinders that are fired by spark plugs 16 and 18.

In order to properly synchronize the simultaneous spark plug firing of cylinders 1 and 4 and cylinders 2 and 3, as a function of piston position, the ignition system of this invention develops voltages that are related to engine crankshaft position. To this end the engine crankshaft 46 is mechanically connected to a pair of disks 48 and 50 which respectively have slots 50A and 48A. The disks 48 and 50 cooperate, in a known manner, with pickup coils 52 and 54 to cause a voltage to be induced therein each time that a slot passes a pickup coil. The pickup coils are coupled respectively to squaring circuits 56 and 58 which cause pulses of voltage to be applied to lines 60 and 62. The slots 50A and 48A are spaced 180° from each other so that the voltage pulses developed on conductors 60 and 62 are 180° out of phase.

Figure 3:
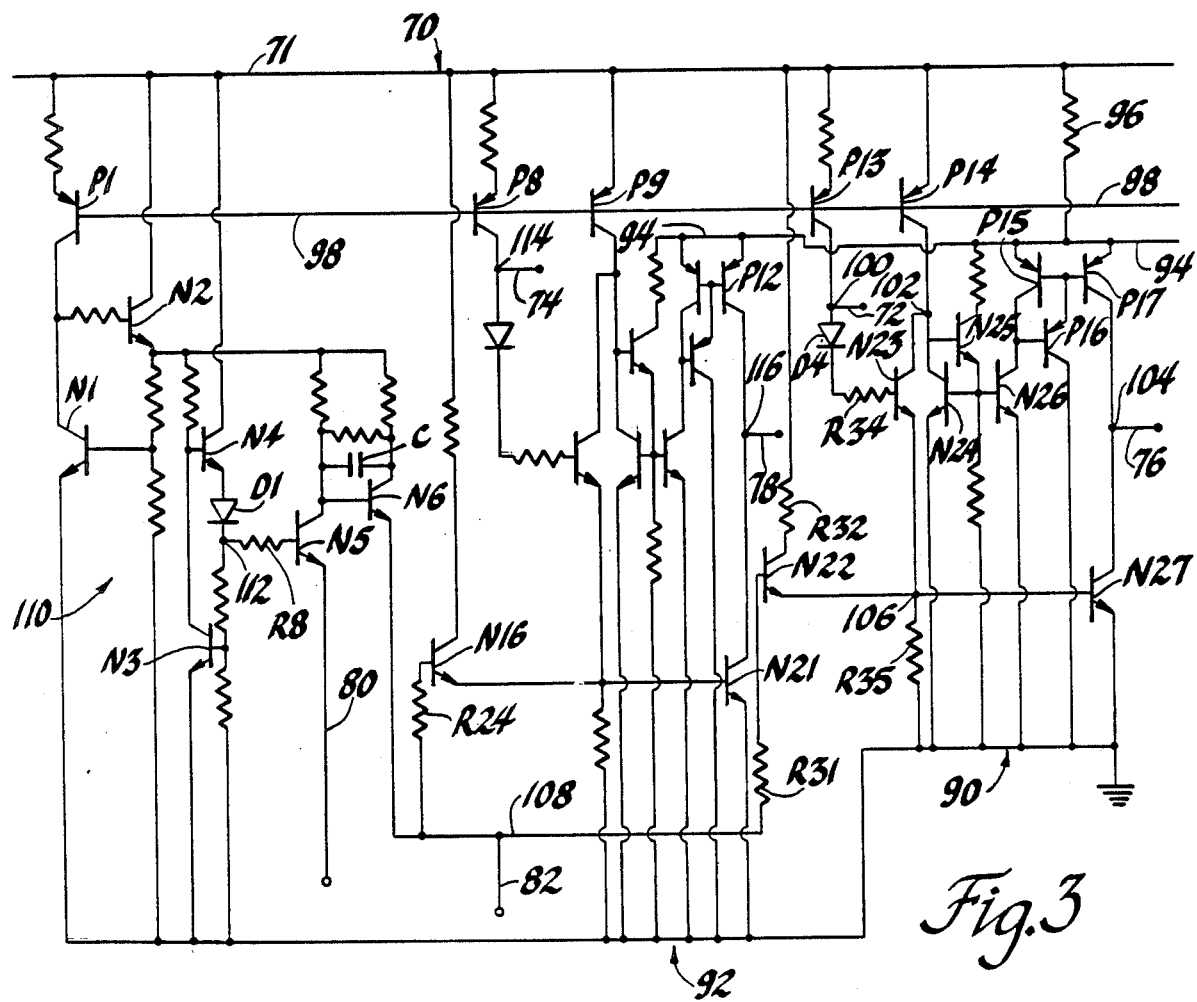
FIG. 3 is a schematic circuit diagram of a part of the circuit that has been illustrated as a block in FIG. 1.

The voltage pulses on conductors 60 and 62 are applied to a flip-flop 64, the output terminals of which are connected respectively to AND gates 66 and 68. The outputs of the AND gates are applied to a control circuit 70 via inverters IN1 and IN2 and conductors 72 and 74. The control circuit 70 is illustrated in detail in FIG. 3. The control circuit 70 is also connected with conductors 71, 76, 78, 80 and 82, all of which are also illustrated in FIG. 3.

The voltages developed on conductors 60 and 62, the flip-flop 64 and the AND gates 66 and 68 provide a synchronizing arrangement which will permit the Darlington connected transistor 36 to control the firing of spark plugs 12 and 14 during a given 180° rotation of crankshaft 46 and which will permit Darlington connected transistor 38 to control the spark firing of spark plugs 16 and 18 during another 180° rotation of crankshaft 46. What has just been described may be termed a bank selector since it selects either the bank of cylinders 1 and 4 or the bank of cylinders 2 and 3 for spark plug firing in synchronization with crankshaft position. This bank selector arrangement can take known forms other than the arrangement that has been described and the specific manner of bank selection does not form a part of this invention.

Figure 2:
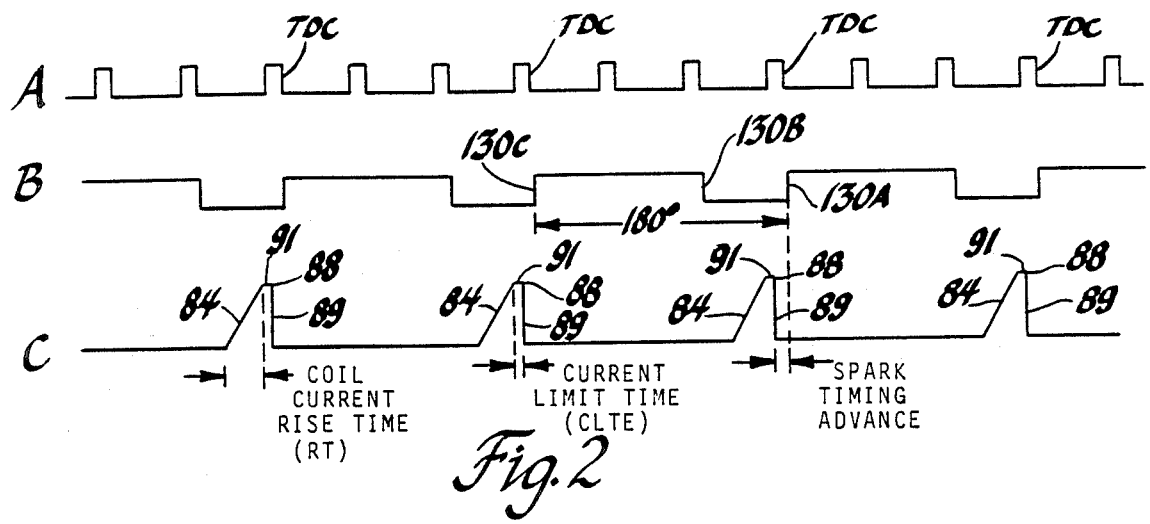
FIG. 2 illustrate waveforms which are developed in various parts of the ignition system illustrated in FIG. 1.

The transistors 36 and 38, when initially biased conductive, are biased to a fully saturated condition. This being the case, the current through the primary winding is limited by the resistance of a given primary winding and the very small resistance of the resistor 40. FIG. 2C depicts primary winding coil current as a function of elapsed time. When a Darlington connected transistor 36 or 38 is biased conductive, the current increases from zero along a ramp function identified by reference numeral 84 in FIG. 2C. As the current increases from zero along the ramp curve 84 the voltage developed across the small resistor 40 and consequently the voltage at junction 45 will follow the ramp function 84. The voltage at junction 45 is applied to the control circuit 70 via the conductor 80 and when the current level reaches a value designated by reference numeral 88, in FIG. 2C, the transistors 36 or 38 are brought out of saturation and become biased into a current limiting mode. In the current limiting mode, the current remains at the level designated by reference numeral 88 in FIG. 2C. When the current reaches the current limit value 88 of FIG. 2C, the control circuit 70 outputs a signal on line 82 which is utilized to control the ignition system in a manner to be more fully described hereinafter.

When a Darlington transistor 36 or 38 is biased nonconductive the primary winding is deenergized and consequently the primary winding current drops to zero. This is depicted by the portion of the current curve designated as 89. When primary current is cutoff, a pair of spark plugs are fired. In FIG. 2C the time period required for coil current to rise to the current limit value is identified as RT. This time period will be referred to hereinafter and can be termed the rise or ramp time of primary winding current. FIG. 2C also depicts the time period that a transistor 36 or 38 is operating in the current limit mode. This time period has been identified as CLTE and it corresponds to the flat portion 91 of the coil current curve where primary current does not vary with the passage of time.

The control circuit 70, which is illustrated in detail in FIG. 3, will now be described. This control circuit has two identical parts or sections generally designated respectively as 90 and 92 which respectively control the switching of transistors 36 and 38. A conductor 94, which is common to sections 90 and 92, is connected to the positive side of direct voltage source 34 by resistor 96 and conductor 71. A pair of PNP transistors P13 and P14 have their emitters connected to conductor 71. The bases of these transistors are connected to a constant current source (not illustrated) via conductor 98. The collector of transistor P13 is connected to a node or junction 100 and the collector of transistor P14 is connected to junction 102. The purpose of transistors P13 and P14 is to provide a constant current source arrangement.

The section 90 has a PNP transistor P17 connected between conductor 94 and a junction or node 104 that is connected to the base of Darlington transistor 36 via conductor 76. An NPN transistor N27 has its collector connected to junction 104 and its emitter connected to ground. When transistor P17 is conductive it supplies sufficient base current to transistor 36 to cause it to become saturated or fully conductive. When transistor N27 is biased conductive it shunts the base drive to transistor 36 and causes the base current to transistor 36 to be reduced to such a level that transistor 36 is biased out of saturation and into a current limit mode. Accordingly, the primary winding current is limited to a constant value or level 88 shown in FIG. 2C. Whenever transistor P17 is biased fully nonconductive base drive to transistor 36 is cutoff with the result that transistor 36 is biased fully nonconductive to thereby interrupt the primary winding circuit and cause a voltage to be induced in the secondary winding 20 that causes spark plugs 12 and 14 to be fired in series.

The circuit section 90 has PNP transistors P15 and P16, NPN transistors N23, N24, N25 and N26 and a plurality of resistors, all connected as shown in FIG. 3. The base of transistor N23 is connected to control junction 100 by resistor R34 and diode D4. When the voltage at junction 100, and hence on the base of transistor N23, is at a low level the transistor N23 is biased nonconductive. When transistor N23 is biased nonconductive it causes transistor P17 to be biased conductive and consequently Darlington transistor 36 is biased conductive. When the voltage on junction 100 goes to a high level transistor N23 is biased conductive causing transistor P17 and Darlington transistor 36 to be biased nonconductive. In summary, Darlington transistor 36 is biased conductive for a period of time that corresponds to the period of time that the voltage at junction 100 is at a low level. This time period is the so-called dwell time since, during this time period, primary winding 28 is energized. The period of time that Darlington transistor 36 is biased nonconductive corresponds to the period of time that the voltage on junction 100 is at a high level.

The control section 90 has an NPN transistor N22. The collector of this transistor is connected to line 71 via resistor R32. The emitter of transistor N22 is connected to the base of transistor N27 and to junction 106. A resistor R35 is connected between junction 106 and ground. The base of transistor N22 is connected to conductor 108 via resistor R31. When transistor N22 is biased conductive it biases transistor N27 conductive. The conduction of transistor N27 causes the Darlington transistor 36 to be pulled out of saturation and biases transistor 36 into the current limiting mode where current is limited by transistor 36 to the level 88 shown in FIG. 2C.

The switching state of transistor N22 is controlled by a part or section of the control circuit 70 which has been generally designated as 110. This circuit responds to the voltage at voltage divider junction 45, shown in FIG. 1. The circuit section 110 comprises a PNP transistor P1, NPN transistors N1-N6, a plurality of resistors, a capacitor C and diode D1. The circuit 110 develops a reference voltage at junction 112 which is applied to the base of transistor N5 through resistor R8. The emitter of transistor N5 is connected to voltage divider junction 45 (FIG. 1) via conductor 80. When the voltage applied to the emitter of transistor N5 from junction 45 increases to a predetermined value the amount of current conducted by transistor N5 is decreased. This corresponds to a level of primary winding current 88 (current limit) shown in FIG. 2C. When the conduction of transistor N5 is reduced or decreased the amount of current conducted by transistor N6 is increased and accordingly the voltage on conductor 108 goes to a high level. The increased conduction of transistor N6 causes transistors N22 and N27 to conduct and Darlington transistor 36 is biased out of saturation and into its current limiting mode. The voltage on conductor 108 is applied to line 82 and this voltage indicates whether or not a Darlington transistor 36 or 38 has been biased into the current limit mode. The voltage on lines 108 and 82 is at a high level for a period of time that corresponds to the time period that Darlington transistor 36 is operating in its current limit mode and the point of the low to high voltage transition of this voltage occurs when the current limit is reached.

The circuit section 92 controls the switching state of Darlington transistor 38 and since it is identical with circuit section 90 it will not be described in detail and most of the elements have not been designated by reference indicia. The circuit section 92 has transistors P12 and N21 which perform the same function as transistors P17 and N27 of circuit section 90. Transistor N16 has its base connected to line 108 via resistor R24 and this transistor performs the same function as transistor N22.

Junctions or nodes 114 and 116 of circuit 92 correspond to junctions 100 and 104 of circuit section 90. Transistors P8 and P9 perform the same function as transistors P13 and P14.

During the manufacture of components of the ignition system of this invention the resistors 41 and 43 (FIG. 1) are laser trimmed to values such that the system will properly respond to bias transistors 36 or 38 into a current limit mode and cause a current limit signal voltage to be developed at conductors 108 and 82 when a predetermined magnitude of primary winding current is attained. Assuming, by way of example and not by way of limitation, that a transistor 36 or 38 is to be biased into a current limit mode when primary winding current reaches 9 amps the resistance values of resistors 41 and 43 are adjusted by trimming these resistors such that when 9 amps flow through resistor 40 and parallel connected resistors 41 and 43 the voltage developed at junction 45 will be of a value to cause transistor N6 (FIG. 3) to be biased conductive to thereby bias transistor 36 or 38 to its current limit mode and cause a signal voltage to be developed on conductors 108 and 82. With an assumed current limit level of 9 amps the current level 88, shown in FIG. 2C, will represent 9 amps of primary winding current.

Referring back now to FIG. 1, a wheel or disk 120 is illustrated which is driven by the engine crankshaft 46. This wheel or disk has six slots which are spaced 60° apart. As the disk 120 rotates, pulses of voltage are induced in a pickup coil 122 which are applied to a squaring circuit 124. The output of the squaring circuit 124 is applied to a line 126 and these pulses are depicted in FIG. 2A. The pulses, as shown in FIG. 2A, are 60 crankshaft degrees apart and some of the pulse edges of the pulse train shown in FIG. 2A occur at a top dead center position of a pair of pistons. These top dead center positions have been identified as TDC and they occur at each 180° of crankshaft rotation. The 60° pulses shown in FIG. 2A are converted to a waveform shown in FIG. 2B by a signal converter circuit 128. The output of the signal converter circuit 128 is applied to conductor 130 and is illustrated in FIG. 2B. This signal has repetitively occurring voltage transitions 130A, 130B and 130C. The voltage transitions 130A and 130C occur at top dead center positions of a pair of pistons whereas the voltage transition 130B occurs at a crankshaft angle that is 60° before top dead center. The voltage transitions 130C and 130A are spaced by 180° of crankshaft rotation.

The system of FIG. 1 has an electronic control module 132, hereinafter referred to as an ECM. The ECM 132 takes the form of a programmed microprocessor which is capable of providing spark timing information for controlling the spark timing advance. The ECM is well known to those skilled in the art and may be of a type disclosed in the U.S. Pat. No. 4,231,091 to Motz, granted on Oct. 28, 1980. The ECM has its own clock pulse source and it computes time periods in a manner known to those skilled in the art.

The ECM 132 responds to the high to low voltage transitions 130B illustrated in FIG. 2B. These transitions provide reference pulses for the ECM and the ECM computes spark advance value relative to these pulses. The ECM further receives engine speed information via lines 134 and 136. These lines provide the ECM with the 60° pulses shown in FIG. 2A. In addition, the ECM receives other information from the engine 10 via a line 138. This information may include, for example, engine temperature and engine manifold pressure and other factors well known to those skilled in the art.

When the ECM 132 is controlling spark advance (EST mode of operation) it develops a signal on line 140 which causes a spark firing event to occur, that is it causes one of the Darlington transistors 36 or 38 to be biased nonconductive.

The engine speed pulses on line 134 are applied to an engine speed switch 142. The engine speed switch 142 develops a control signal on line 144 which controls gate 144A. When the gate 144A is closed both the dwell and the spark timing are now controlled solely by the waveform illustrated in FIG. 2B. With gate 144A closed the FIG. 2B pulses are applied to AND gates 66 and 68 via line 146, inverter IN3, closed gate 144A, line 147, junction 149 and lines 151 and 153. Thus, when gate 144A is closed an ignition coil is energized at the occurrence of the voltage transition 130B and is deenergized at the occurrence of voltage transition 130A. The net result of this is that an ignition coil is energized for 60° of crankshaft rotation and an ignition spark occurs at top dead center. This condition will occur when the engine is being cranked prior to starting.

When gate 144A is open the time of spark firing will be controlled either from the bypass advance circuit 143 or by the EST output signal on line 140. When the EST signal is controlling, the system is in the so-called EST mode and when the output of bypass advance circuit 143 is controlling the system is operating in the so-called bypass mode. The system is arranged such that when the ECM is operating properly the EST signal on line 140 is applied to the dwell and advance control 150. However, in the event of a failure of the ECM, or certain other malfunctions, a bypass control signal is developed on line 152 which controls gates G1 and 144A. The bypass control signal is also developed when the engine is being cranked. When gate G1 is closed the EST signal on line 140 is aplied to the dwell and advance control 150 via line 145. During engine cranking the bypass control signal on line 152 causes gate G1 to be open and gate 144A to be closed. At this time the bypass signal on line 152 and the speed signal on line 144 are applied to gate 144A to cause this gate to be closed. When the system is operating in the bypass mode and engine speed is above 400 rpm gates G1 and 144A are opened. The output of bypass circuit 143 now controls spark timing and it is applied to dwell and advance control 150 via line 155.

The bypass control circuit 143 develops an output binary control signal that represents a programmed constant time period. The system is arranged such that the spark advance signal developed by circuit 143 causes spark advance, in terms of crankshaft degrees, to be increased with increasing engine speed. When the bypass advance timing is utilized the spark timing is controlled solely as a function of engine speed.

The gating circuit for controlling the various modes of operation, i.e., bypass mode, EST mode and cranking mode can take various forms other than the one that has been described as long as the following conditions are met.

(1) During the bypass mode with engine speed below 400 rpm spark timing and dwell time are controlled exclusively by the pulses shown in FIG. 2B. This will occur when the engine is being cranked.

(2) During the bypass mode and with engine speed above 400 rpm spark timing is controlled by the output of bypass advance circuit 143.

(3) During the EST mode spark timing is controlled by the EST signal on line 145.

Figure 4:
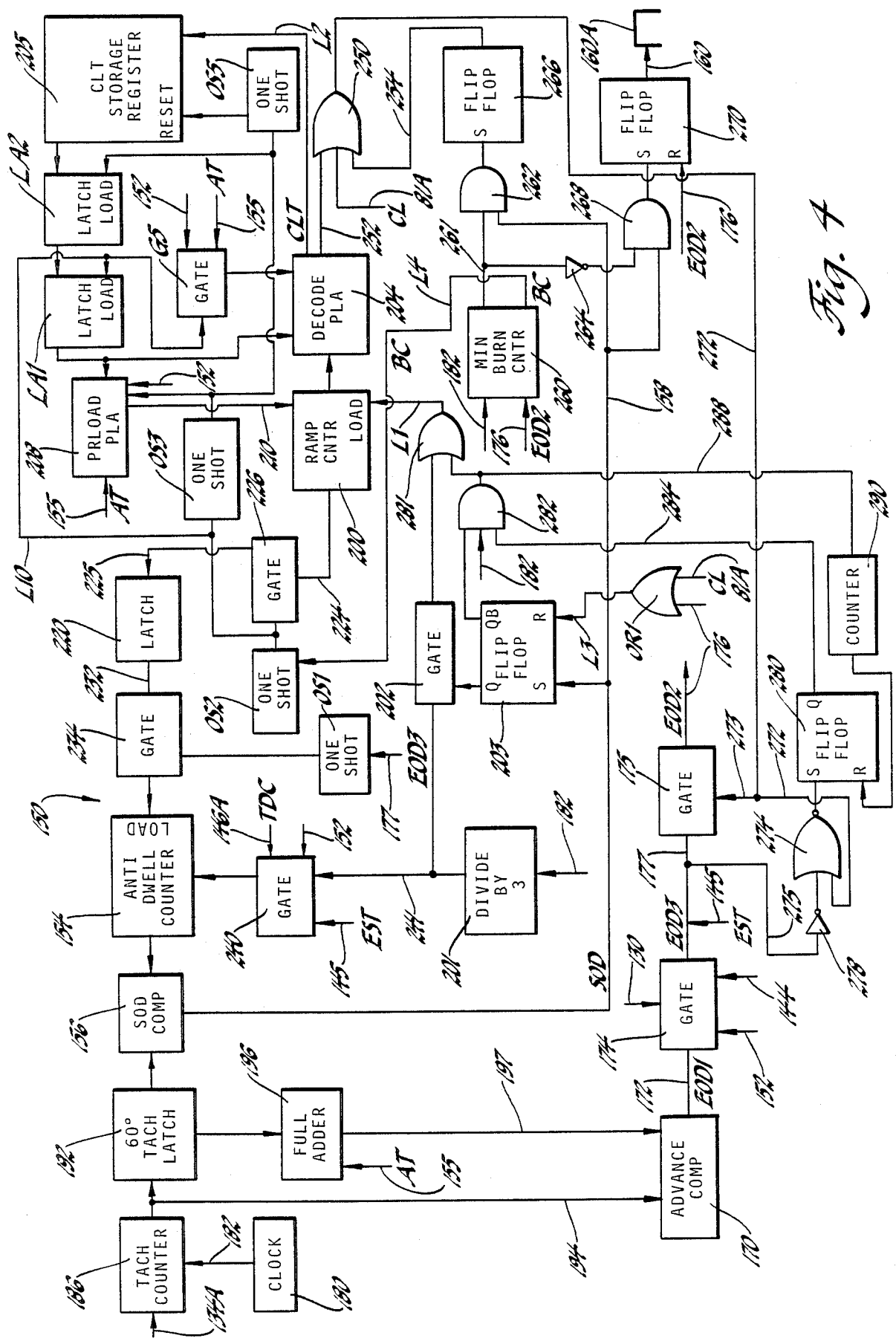
FIG. 4 illustrates the dwell and advance control of the ignition system of this invention which is illustrated as a block in FIG. 1.

The dwell and advance control 150 is illustrated in FIG. 4 and will now be described. Referring to FIG. 4, it is seen that the system has an anti-dwell ripple counter 154 coupled to a digital comparator 156. The digital comparator is a so-called start of dwell comparator and develops a signal on line 158 which will hereinafter be referred to as the SOD signal. When an SOD signal is developed on line 158 it will cause a corresponding SOD signal to be developed on line 160, illustrated in FIGS. 1 and 4. When the SOD signal appears, one of the output transistors 36 or 38 is biased conductive to initiate energization of a primary winding of an ignition coil.

The system of FIG. 4 has another digital comparator 170 which is a so-called advance comparator. The advance comparator develops an end of dwell signal EOD1 on line 172 which is developed at the desired spark timing angle and which, under certain modes of operation, will immediately cause one of the transistors 36 or 38 to be biased nonconductive. This signal on line 172 is applied to an EOD developing control circuit that includes a gate 174. The gate 174 responds to the bypass control signal on line 152, the speed signal on line 144 and the signal on line 130 which is illustrated in FIG. 2B. The gate 174 is closed whenever the system is operating in the bypass mode and engine speed is above 400 rpm. Further, the gate 174 is closed only during the time that the signal shown in FIG. 2B is at a low level, that is for a period of 60° before top dead center. The output of gate 174 is connected to gate 175 via a line 177. A signal EOD3 is developed on line 177 and the output of gate 175 develops an EOD2 signal on line 176. As will be explained more fully hereinafter the EOD2 signal will be developed on line 176 at the same time that the EOD3 signal appears on line 177 or will be developed on line 176 at a point delayed from the development of the signal on line 177.

The system of FIG. 4 has a clock 180 for developing constant frequency clock pulses on line 182. The clock frequency may be about 31.25 Khz. The clock pulses on line 182 are applied to a TACH COUNTER 186 which is controlled by the 60° pulses of FIG. 2A applied thereto by conductor 134A. Conductor 134A is connected to conductor 126 by conductor 134 as illustrated in FIG. 1. The TACH COUNTER counts the constant frequency pulses on line 182 for each period of 60° of crankshaft rotation and loads the count so counted into the 60° TACH LATCH or register 192 at the end of a 60° period and then counts again for a 60° period. Each time a 60° period occurs the pulses so counted are loaded into the 60° TACH LATCH register 192. The 60° latch 192 therefore contains and stores a pulse count that is a function of the clock frequency of clock 180 and the time that elapses during 60 degrees of rotation of crankshaft 46. The pulse count developed by TACH COUNTER 186 is also applied to line 194 and hence to advance comparator 170.

As previously mentioned, the ignition system of this invention can operate in either the bypass mode or in the EST mode. In either mode the dwell time is controlled. The dwell control arrangements for each mode are similar but not identical. The advance and dwell control, when the system is operating in the bypass mode, will now be described.

When operating in the bypass mode a binary number that represents the programmed bypass advance time AT developed by bypass advance circuit 143 is applied to the full adder 196 by line 155. The output of the 60° LATCH 192 is also coupled to full adder 196 and the output of adder 196 is connected to advance comparator 170 by line 197. The digital number applied to line 155 represents the 2's compliment of the progrmmable advance time which results in a subtraction of the advance time from the 60° time. The contents of the TACH COUNTER 186 are compared to the sum outputs of the full adder 196 by comparator 170. The TACH COUNTER is reset at 60° before initial timing and starts incrementing up. When the count of TACH COUNTER 186 becomes equal to the sum outputs of the full adder 196 the end of dwell point is reached and accordingly the signal EOD1 on line 172 is developed. When the signal EOD1 is developed it may cause an immediate spark plug firing or the spark plug firing may, under some conditions of operation, occur at some time period after the occurrence of EOD1 in a manner that will be described hereinafter. It will be appreciated that since the advance time AT is a constant value, spark advance, in terms of engine crankshaft degrees, will increase with increasing engine speed.

The dwell control arrangement, when the system is operating in the bypass mode, will now be described. The dwell control system includes a ramp counter 200 which is connected to a gate 202 via OR gate 281 and line L1. When gate 202 is closed the counter 200 is connected to clock 180 by a divide by 3 divider 201 and OR gate 281 so that the ramp counter 200 is clocked at ⅓ of the frequency of clock 180 via line L1. The gate 202 may be closed for the time period RT or in other words for a period of time corresponding to the time that elapses from initiation of primary winding current until the current reaches the current limit value. In order to accomplish this a flip-flop 203 is provided which responds to an SOD signal on line 158 and to a signal on line L3. The Q terminal of flip-flop 203 is connected to gate 202 and its QB terminal is connected as one input of an AND gate 282. The gate 202 is closed for a period of time in which a signal is developed on the Q terminal of flip-flop 203. The line L3 is connected to the output of an OR gate OR1. One of the inputs to the OR gate OR1 is the line 81A which has the current limit signal applied thereto. The other input to OR gate OR1 is the line 176 which is the EOD2 signal applied thereto. The line 81A is the output of flip-flop 81 shown in FIG. 1. The output waveform of flip-flop 81 is identified as 81B and it has a leading edge 81C and a trailing edge 81D. The leading edge 81C occurs when current limit is reached and the trailing edge 81D occurs at the end of dwell. The R terminal of flip-flop 81 is connected to a NOR gate NG1 the inputs of which are connected to the outputs of AND gates 66 and 68. The S terminal of flip-flop 81 is connected to line 82 and as will be recalled, the voltage on this line increases to a value sufficient to trigger flip-flop 81 when current limit is reached. If the current limit signal CL is developed on line 81A before the end of dwell signal EOD2 is developed on line 176 clock pulses will be counted by ramp counter 200 for the time period RT. The number of pulses counted by counter 200, under this condition of operation, therefore corresponds to the time period RT.

The ramp counter 200 is coupled to a programmable logic array 204 that serves to develop a binary signal that corresponds to the magnitude of the binary signal attained by counter 200. Programmable logic arrays are well known to those skilled in the art and in general comprise an array of logic gates that are connected to a plurality of input lines and a plurality of output lines. A binary signal applied to the input lines will result in the development of a programmed binary signal on its output lines. One example of a programmable logic array is disclosed in the U.S. Pat. No. 3,949,370 to Reyling et al. The PLA 204 responds to the attained binary count in ramp counter 200 that corresponds to time RT and develops a binary current limit time signal CLT based on the magnitude of the time period RT. The PLA 204 develops one of three different current limit time signals CLT1, CLT2 or CLT3, the magnitudes of which depend upon the ramp time RT. Thus, the PLA 204 operates as a digital function generator which develops a CLT signal as a function of the magnitude of the ramp time. The CLT signal that is developed by PLA 204 is applied to a current limit storage register 205 by line L2 where it is stored for use in a manner to be described. As mentioned, the binary output signal of PLA 204 represents one of three different time periods CLT1, CLT2 or CLT3. The arrangement is such that as the ramp time increases the current limit time that is developed by PLA 204 will increase. By way of example, and not by way of limitation, the following table sets forth the three current limit times for various ranges of ramp time.

| RAMP TIME | CURRENT LIMIT TIME (CLT) |
|---|---|
| 0 to 3.8 ms | 780 μs |
| 3.8 ms to 4.5 ms | 970 μs |
| 4.5 ms to 23 ms | 1642 μs |

The digital binary output signal (CLT) of PLA 204 is periodically loaded into CLT storage register 205 immediately after ramp counter 200 has counted the time RT. The binary number that is stored in CLT storage register 205 represents a time period that is related to the ramp time RT of a given coil. As will be more fully explained hereinafter the binary number loaded into storage register 205, for a given coil, is later utilized to control the start of dwell for this same coil. Thus, if it is assumed that the data in register 205 corresponds to the ramp time of coil C1 the digital number stored in register 205 will be utilized to control the start of dwell of coil C1. This is an important feature of the invention since the data collected for a given coil is utilized to control the time that the same coil is energized. Since the resistance and inductance of coils C1 and C2 may not be matched, the system of this invention accommodates for any such variation since it collects data in regard to a given coil and then utilizes this at a later time to control the start of dwell of this same coil.

In order to further explain the operation of the system shown in FIG. 4 it is pointed out that the system has a minimum burn counter 260. The minimum burn counter has clock pulses applied thereto via line 182. The counter 260 also receives the end of dwell signal EOD2 on line 176. The counter has two outputs, namely line 261 and line L4. The line L4 is connected to one-shot multivibrator OS2 and line 261 is connected to AND gate 262. When an EOD2 signal is applied to counter 260 it starts counting clock pulses. After the elapse of a time period of about 500 microseconds the counter develops a signal BC on line L4 which triggers the one-shot OS2. The one-shot OS2 is therefore triggered 500 microseconds after the occurrence of EOD2. The counter 260 develops a signal on line 261 after the elapse of a period of time of about 700 microseconds from the occurrence of EOD2. The counter 260 and associated circuitry will be described in more detail hereinafter.

The system of FIG. 4 has latch circuits LA1 and LA2. Latch LA2 is connected to the CLT storage register 205 and the load control terminal of this latch is connected to the output of one-shot multivibrator OS3. Latch LA2 is connected to latch LA1. Latch LA1 is connected to preloader circuit 208 and is also connected to the programmable logic array 204. The load control terminal of latch LA1 is connected to the output of one-shot multivibrator OS2 by a line L10. The output of one-shot OS3 is connected to a one-shot multivibrator OS5 which is connected to a reset terminal of CLT storage register 205. The programmable logic array 204 is also connected to the output of a gate circuit G5. The gate circuit G5 is connected to one-shot OS2, to the programmed bypass advance signal AT on line 155 and the bypass control signal 152. When the system is in the bypass mode the gate G5 will gate the AT signal into the PLA 204 at the time that an output signal is developed by one-shot OS2. Thus, the gate G5 responds to the bypass control signal 152 and the output of one-shot OS2. When the system is in the EST mode the gate G5 is in a condition (open) that will not allow signal AT to be gated into PLA 204. In the EST mode the signal at latch LA1 is applied to PLA 204 when the one-shot OS2 develops an output.

With the foregoing in mind let it be assumed that an end of dwell signal EOD2 has been developed on line 176. This signal is developed when one of the transistors 36 or 38 is to be biased nonconductive to cause a spark to be developed. Let it be assumed that primary of coil C1 has been deenergized to cause plugs 12 and 14 to be fired. The signal EOD3 triggers one-shot OS1 and signal BC on line L4 triggers one-shot OS2. One-shot OS2 triggers one-shot OS3. When OS3 is triggered or actuated it causes a PLA preloader circuit 208 to load ramp counter 200 via line 210. When one-shot OS3 is actuated preloader circuit 208 causes the ramp counter 200 to be loaded with a binary signal that represents one of the CLT values stored in register 205 and with a signal AT on line 155 that represents the programmed advance time developed by bypass advance circuit 143. The preloader circuit is controlled by the bypass advance signal on line 152. When the system is in the bypass mode the signal AT is loaded into ramp counter 200, as has been described. When the system is in the EST mode the signal AT is not loaded into ramp counter 200. The signal AT is a digital binary number which represents the desired spark advance time when the system is operating in the bypass mode. At the assumed firing point of coil C1 therefore the ramp counter 200 has been preloaded with a current limit time value CLT and a spark timing value AT so that the contents of the ramp counter now represent a time period CLT+AT.

When the next start of dwell signal SOD begins, which will energize coil C2, the gate 202 is actuated to cause the clock pulses on line 182 to be applied to the ramp counter 200 through the divide by 3 divider 201. The ramp counter 200 now counts up from the value CLT+AT until primary winding current reaches the current limit value. Accordingly, the ramp counter 200 will be counted up with constant frequency clock pulses (divided by three) for a time period that equals RT. At the end of time period RT the ramp counter 200 will contain the count CLT+AT+RT.

As previously mentioned, the CLT signal in register 205 is periodically loaded into ramp counter 200. The specific manner in which this is accomplished, by the action of latches LA1 and LA2, will now be described. When one-shot OS2 develops an output the ramp count attained by ramp counter 200 is loaded into a latch 220 in a manner that is more fully described hereinafter. When one-shot OS2 develops an output the digital signal or contents of the latch LA2 is loaded into the latch LA1. When a signal now occurs at the output of one-shot OS3 the contents of the latch LA1 is loaded into ramp counter 200 to form a ramp counter preload. Further, when one-shot OS3 develops an output the contents of the CLT storage register 205 is loaded into the latch LA2. One-shot OS5 is triggered after OS3 is triggered and when OS5 develops an output the CLT register 205 is reset so that it is ready to receive a digital signal from PLA 204. It will be apparent that CLT values that are developed for a given coil are used as a CLT preload into ramp counter 200 for this same coil due to the provision of latches LA1 and LA2. Putting it another way, the CLT data that is developed for a given coil is stored and then later used as a preload for ramp counter 200 when this same coil is again energized.

As previously mentioned, the latch LA1 is connected to PLA 204. When one-shot OS2 develops an output the contents (CLT) of latch LA2 is loaded into LA1 and consequently the contents of LA1 is applied to PLA 204. This occurs prior to the time that the output of OS3 causes the contents of latch LA1 to be loaded into ramp counter 200. Accordingly, PLA 204 has the contents of latch LA1 applied thereto prior to the time that ramp counter 200 is loaded with the contents of LA1. Thus, PLA 204 knows what was preloaded into ramp counter 200 before this preloading occurs. The PLA 204 operates such that the contents of LA1, which is applied to PLA 204 from latch LA1 at the occurrence of OS2, offsets the LA1 preload into ramp counter 200 so that PLA 204 does not provide a CLT signal that is a function of the preload to ramp counter 200. Thus, the effect of the preload has been cancelled out by applying the contents of LA1 to PLA 204 prior to the time that the ramp counter 200 is preloaded with the contents of LA1. Accordingly, PLA 204 provides a CLT signal that is only a function of a time period that begins when ramp counter 200 begins to count up and ends when ramp counter 200 stops counting up.

When the system is in the bypass mode the AT signal is applied to PLA 204 via gate G5 prior to the time that the ramp counter 200 is preloaded with AT. Accordingly, the effect of the AT preload is cancelled out by applying AT to PLA 204 prior to the time that ramp counter 200 is preloaded with AT.

Figure 5:
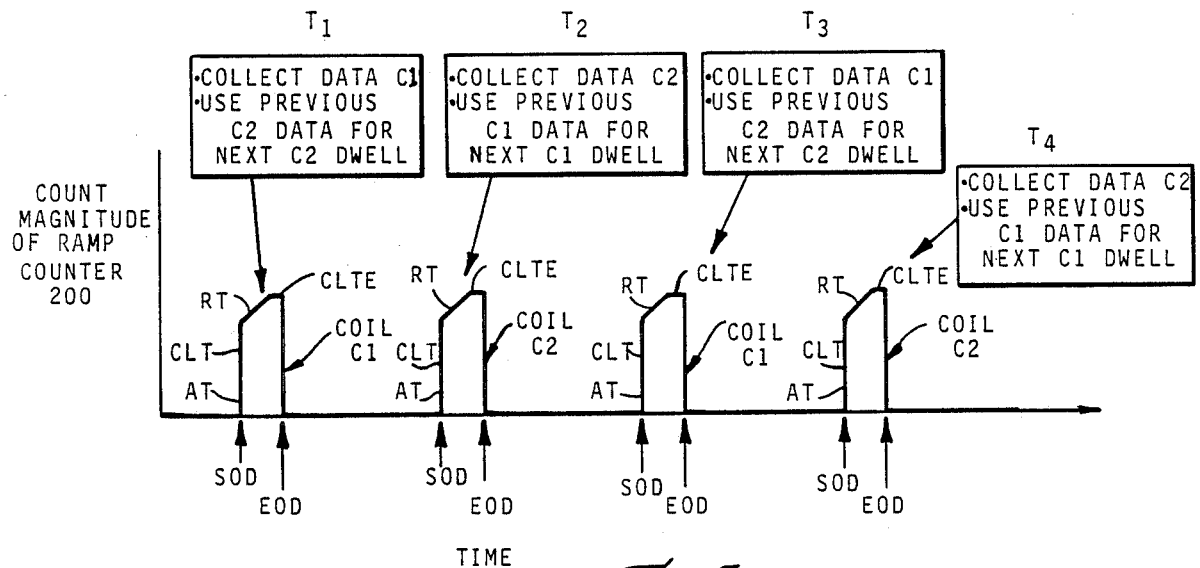
FIG. 5 illustrates the contents of a ramp counter that is used in the ignition system of this invention when the system is operating in the bypass mode.

Before proceeding to a further description of this invention it is believed that it would be helpful to generally describe the operation of the ramp counter 200 relative to periodic alternate energization of coils C1 and C2. Referring now to FIG. 5, the dwell or "on" times (SOD to EOD) of coils C1 and C2 are illustrated as well as the contents of the ramp counter 200 as a function of elapsed time when the system is operating in the bypass mode. The timing points identified as SOD indicate the point in time where a respective primary winding of a coil C1 or C2 is energized and EOD is the point in time when a coil is deenergized. As previously explained, when a given coil is energized the ramp counter is preloaded with the advance time AT and the selected current limit time CLT. This is illustrated in FIG. 5 where the preload is identified as CLT and AT. Assuming that the ramp counter has been loaded with CLT plus AT, the ramp counter increments along a line RT until the current limit point is reached whereupon counting ceases. This is indicated by line CLTE. During the time period CLTE the count in counter 200 does not increase but remains constant at a value AT+CLT+RT. The time period CLTE corresponds to the time period that one of the transistors 36 or 38 is operating in current limit. The ramp counter 200, when EOD occurs, contains a binary count that is equal to AT+CLt+RT. The ramp count so attained is loaded into a latch circuit in a manner that will be described.

FIG. 5 also illustrates the fact that during the "on" time of coil C1 data is collected in regard to coil C1 and that subsequently C2 data is utilized to determine the start of dwell of coil C2. Thus, the ramp counter collects data in regard to a given coil, for example coil C1, but this data is not utilized to determine the start of dwell of the subsequent coil C2. It is utilized to control the "on" time of the next occurring coil C1. Referring now back to FIG. 4, it is seen that the system has a latch circuit or latch register identified by reference numeral 220. The latch 220 is periodically loaded by the contents of the ramp counter 200 via lines 224 and 225 when gate 226 is biased conductive. The gate 226 is connected to one-shot OS2 and is biased conductive when the one-shot OS2 develops an output. The counter 154 is periodically loaded with the contents of latch 220 via line and gate 234. The gate 234 is connected to one-shot OS1 so that shortly after the occurrence of EOD3 gate 234 is actuated to cause the contents of latch 220 to be loaded into the anti-dwell counter 154.

Assuming now that the C1 ignition event has just occurred, the following sequence of events will take place.

1. At the C1 ignition event (EOD) the anti-dwell counter 154 is loaded with data from the latch 220.
2. The latch 220 is loaded with the contents ramp counter 200. The contents of ramp counter 200 at this time corresponds to coil data for coil C1.
3. The contents of ramp counter 200 are used to determine the CLT preload time for the next C1 event and this preload gets stored in CLT storage register 205.
4. The ramp counter gets preloaded with the advance time AT and the CLT time determined from the previous C2 event.
5. At the occurrence of a fire control signal, which will be explained in more detail hereinafter, the clocking of the anti-dwell counter 154 is started.
6. When the count of the anti-dwell counter is greater than the count of the 60° TACH latch 192 an SOD signal is generated on line 158.
7. When the SOD signal is generated the ramp counter 200 starts to count and coil C2 is energized.
8. When the current through the primary winding of coil C2 reaches the current limit value the counting by the ramp counter is discontinued.
9. When the EOD signal is generated the ignition event occurs and the cycle repeats for the next coil C1.

The foregoing sequence of events is provided by a suitable timing and logic system which, for simplification of illustration, has been illustrated as gates in FIG. 4.

With the foregoing in mind, and at the expense of some reiteration, it will be evident that the ramp time data RT and the resultant CLT data that is selected for a given coil is stored and then subsequently used to determine the dwell time for this same coil. This can be further explained by examining the coil C1 data transfer with passage of time. With reference again to FIG. 5, timing points or periods $T_1$-$T_4$ identify consecutive occurring time periods in which coils C1 and C2 are energized (SOD) and deenergized (EOD). At time $T_1$ coil C1 is energized and the ramp time RT and resultant selected current limit time CLT are developed for coil C1. The selected time $T_2$ (180° after $T_1$) the C1 data that is in SOD latch 220 is loaded into anti-dwell counter 154. This can now be used to control the dwell of coil C1 during time period $T_3$. It therefore is seen that coil C1 data was collected during time period $T_1$ but it is not used to control the dwell of coil C1 until time period $T_3$. This means that coil C1 collected data is utilized to control the dwell for coil C1 even though coil C2 is energized (time $T_2$) and deenergized between time periods $T_1$ and $T_3$. The same analysis can be made for coil C2. This data collected for coil C2 (time period $T_2$) is used to control the dwell of coil C2 at time period $T_4$. Between times $T_2$ and $T_4$ coil C1 (time $T_3$) is energized and deenergized.

A further description of the operation of the anti-dwell counter 154 will now be provided when the system is operating in the bypass mode. This anti-dwell counter, as previously described, is loaded with the contents of latch 220 whenever a called for ignition event occurs (occurrence of EOD3). This counter then begins to increment at the positive transition of a TDC pulse shown in FIG. 2B. This corresponds to the transition 130A or 130C, illustrated in FIG. 2B. In FIG. 4, this transition is identified as TDC since it occurs at a top dead center of a pair of pistons. When the TDC signal occurs the gate 240 is actuated conductive to cause the anti-dwell counter 154 to be incremented by the clock pulses on line 241. The clock pulses that are applied to line 241 are applied thereto by the divide by three counter 201 so that the anti-dwell counter 154 is incremented at one-third the input frequency of the TACH counter 186. In regard to gate 240, it responds to the TDC signal on line 146A. The signal on line 146A is developed by a one-shot multivibrator OS4 (FIG. 1) connected between lines 146 and 146A. The signal on line 146A is developed in response to the positive or rising transitions of the FIG. 2B signal which occur at TDC. The gate 240 has the bypass control signal applied thereto via line 152. When the system is in the bypass mode the TDC signal on line 146A causes anti-dwell counter 154 to be incremented. When the system is in the EST mode the EST signal on line 145 causes the anti-dwell counter 154 to be incremented.

After the anti-dwell counter 154 has been preloaded by the contents of SOD latch 220 and starts incrementing the SOD comparator 156 compares the count in counter 154 with the output of the 60° latch 192. When the count of the anti-dwell counter 154 reaches or exceeds the contents of TACH latch 192 the comparator 156 issues an SOD signal on line 158. Since the anti-dwell counter 154 is running at one third of the clock frequency the SOD comparator crossover point will occur the equivalent of (180° time minus RAMP time minus current limit time minus ramp time advance time) or in other words, 180° time minus (RT+CLT+AT) after the previous cylinders initial timing point where the anti-dwell counter 154 starts incrementing. The effect of clocking the anti-dwell counter 154 at one third the rate of the TACH counter clock 180 makes the TACH LATCH stored time look like 180° time.

The operation of the ignition system when operating in the EST mode will now be described. In the EST mode a signal developed on line 145 will cause a spark firing event. The spark firing event may occur when signal 145 occurs or at a point in time delayed from the occurrence of signal 145 as will be explained. The EST signal on line 145 is applied to gate 240 and to line 177, shown in FIG. 4.

When the system is operating in the EST mode the ramp counter 200 is not loaded with the advance time AT that is used when the system is operating in the bypass mode. In the EST mode the ramp counter is preloaded with a CLT time and the ramp counter does count-up for a time period. Accordingly, in the EST mode, the ramp counter will attain a count that is equal to ramp time RT added to a selected current limit time or in other words, CLT+RT. This is illustrated in FIG. 6 which illustrates the contents of the ramp counter 200 when the system is operating in the EST mode.

Figure 6:
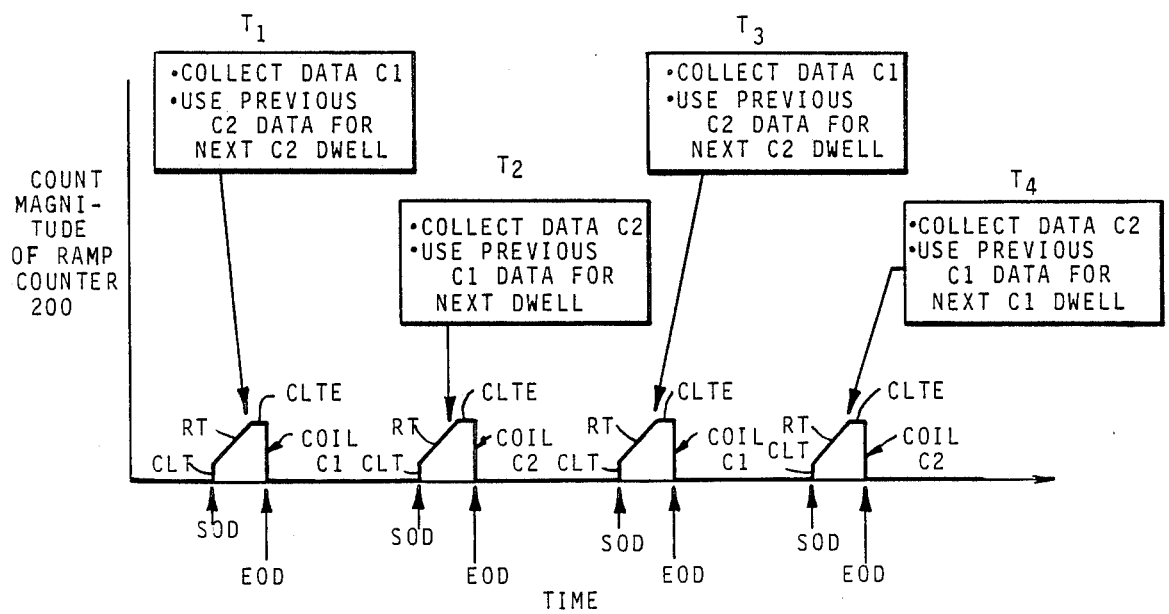
FIG. 6 is similar to FIG. 5 but illustrates the contents of a ramp counter when the system is operating in an EST mode.

As can be seen from FIG. 6, the ramp counter 200 attains a count CLT+RT. In the EST mode the system operates the same as when the system is in the bypass mode except that no advance AT is loaded into the ramp counter when operating in the EST mode.

In the EST mode the anti-dwell counter 154 is loaded with the ramp time RT added to a selected current limit time CLT. When an EST signal occurs on line 145 gate 240 is actuated to cause the anti-dwell counter 154 to be incremented by the clock pulses on line 241. The clock pulses are applied to line 241 by divide by three counter 201 so that the anti-dwell counter 154 is incremented at one-third the input frequency of the TACH COUNTER 186. When the count of the anti-dwell counter 154 reaches or exceeds the contents of TACH LATCH 192 the comparator 156 issues an SOD signal on line 158. Since the anti-dwell counter 154 is running at one-third of the clock frequency the SOD comparator crossover point will occur the equivalent of (180° time minus RAMP time minus current limit time) or in other words, 180 degree time minus (RT+CLT) after the previous cylinder EST firing point where the anti-dwell counter 154 starts incrementing. The effect of clocking the anti-dwell counter 154 at one-third the rate of the TACH COUNTER clock 180 makes the TACH LATCH stored time look like 180° time.

In the operation of this system the EOD signal can originate from the bypass advance circuit or from the ECM, depending upon which system is controlling. In normal operation, the SOD signal will be generated sufficiently ahead of the desired EOD signal so that the coil current will have reached its current limit value before the EOD signal is developed. In the operation of this system it is possible that the EOD point will occur before the coil current reaches the current limit value. This might occur, for example, during high engine acceleration or a sudden change in advance developed by the ECM. The system of this invention is arranged so that it will not allow the EOD signal to generate an immediate ignition event under certain conditions of operation. Thus, when the calculated EOD signal is developed, the system looks for one of three conditions to be met before the EOD signal is actually allowed to generate an ignition event. These three conditions are:

I. The primary current has attained the current limit value.

II. The ramp time is greater than 3.5 milliseconds (minimum ramp count).

III. The SOD signal had occurred during the previous minimum burn time.

In order to detect the three conditions that have been described the system of FIG. 4 has an OR gate 250. The OR gate 250 responds to the signals on input lines 252, 81A and 254. A current signal CL is developed on line 81A whenever primary winding current has reached the current limit value. The signal on line 252 is developed by PLA 204 whenever the ramp time exceeds a period of 3.5 milliseconds. The signal on line 254, is developed in the event that the SOD signal has occurred during the previous minimum burn time.

In order to provide the signal on line 254 the system of FIG. 4 has the minimum burn counter 260 that counts clock pulses on line 182. The burn counter 260, as previously described, is controlled by the EOD2 signal on line 176. When the EOD2 signal occurs the counter 260 starts to count up and it develops an output signal on line 261 after it attains a count corresponding to an elapsed time of about 700 microseconds. The output of counter 260 on line 261 is connected to one input of AND gate 262 and to an inverter 264. The other input of AND gate 262 is connected to the SOD signal on line 158. The output of AND gate 262 is connected to a flip-flop 266 which in turn is connected to line 254.

The system of FIG. 4 has another AND gate 268, one input of which is connected to inverter 264. The other input of gate 268 is connected to line 158 and accordingly receives the SOD signal. The output of gate 268 is connected to a flip-flop 270 which develops an output signal 160A on line 160. Line 160 is also shown in FIG. 1. The flip-flop 270 has an input connected to line 176 that has the EOD2 signal applied thereto.

The output of OR gate 250 is connected to gate 175 by lines 272 and 273. The line 272 is connected to the input of a NOR gate 274. The other input of NOR gate 274 is connected to line 177 by conductor 275 and inverter 278. The output of NOR gate 274 is connected to a flip-flop 280, the output of which is connected to gate 282 by line 284. The output of gate 282 is connected to junction 286 which is connected to line L1 and line 288. The line 288 is connected to a counter 290. The counter 290 is connected to an input of flip-flop 280.

The purpose of the gate 175 and associated circuitry is to provide an output EOD2 signal on line 176 that is developed when an input EOD signal occurs or which is delayed from the occurrence of an input signal. The input EOD signal (EOD3) will either be the output signal of gate 174 or the signal on line 145, depending on whether the system is operating in the bypass mode or the EST mode. If one of the three conditions set forth above occurs before a calculated EOD signal (EOD3) is developed (line 145 or output of gate 174) the gate 175 does not have a delayed output and accordingly the EOD2 signal on line 176 would follow the input signal EOD3. Thus, if the current limit is reached before an input EOD3 signal is developed and applied to gate 175, the current limit signal CL on line 81A causes OR gate 250 to develop an output on line 272 which in turn causes gate 175 to pass the input signal EOD3 to the line 176.

Typically, with normal battery voltages and engine speeds, the primary current for a coil will have reached its current limit value before the input EOD3 signal is developed and applied to gate 175 so that the EOD signal is not delayed. In the event that battery voltage is low, the minimum ramp time or ramp count may occur before current limit is reached. A minimum ramp count corresponding to a ramp time of 3.5 ms can be chosen by calculating the coil current rise times and choosing a value that would allow, for example, 8.5 amps of primary current at battery voltages greater than 12 volts. When the ramp counter 200 attains a ramp count that corresponds to a ramp time that is greater than 3.5 milliseconds (minimum ramp count) the PLA 204 develops a signal that is applied to line 252 that causes the OR gate 250 to develop an output signal. This signal is applied to gate 175 so as to not delay its EOD output from its EOD input. Thus, whenever the ramp time exceeds 3.5 ms, before a calculated EOD3 signal is developed on line 177, the EOD signal is not delayed.

The third condition mentioned above is that the SOD signal (line 158) had occurred during the previous minimum burn time. The minimum burn time is a period of time in which a Darlington transistor 36 or 38 is maintained nonconductive for the minimum burn time after being biased nonconductive. This minimum burn time may be about 700 microseconds. When an EOD2 signal is developed on line 176 it causes a signal to be developed on line 160 via flip-flop 270 that biases a conducting Darlington transistor (36 or 38) nonconductive. This EOD2 signal is also applied to the minimum burn counter 260 and it starts to count up. When counter 260 has counted a time period corresponding to about 700 microseconds it develops a signal on line 261 which is applied to AND gate 268 via inverter 264. The logic arrangement is such that a Darlington transistor (36 or 38) is maintained nonconductive for a minimum time period of about 700 microseconds.

If the SOD signal on line 158 occurs during the previous minimum burn time the AND gate 262 and flip-flop 266 cause a signal to be developed on line 254 which causes the OR gate 250 to develop an output signal on line 272. The signal on line 272 causes the gate 175 to operate such that its output EOD signal (EOD2) signal is not delayed from its input EOD signal (EOD3). This circuit condition is met at high ERPMs where the dwell time required approaches the total dwell time that is physically available (180° time minus minimum burn time). When SOD occurs within the minimum burn range the dwell time for the coil is starting to be truncated. The maximum dwell time allowable is being generated therefore the circuit should not delay EOD2 from EOD3.

From the foregoing it will be apparent that the system determines if one of three above-mentioned conditions has occurred prior to the time that an EOD3 signal is developed on line 177 and if any one of three conditions has occurred the EOD3 signal is not delayed.

On the other hand, if none of three conditions occur prior to the development of an EOD3 signal on line 177 no EOD2 signal will be developed on line 176 until one of the three conditions does occur. By way of example, assume that the system is operating in the EST mode and that an EOD signal is developed on line 145. Let it be further assumed that none of the three conditions mentioned above occurred prior to the time that the EOD signal appeared on line 145. Based on these assumptions there will be no signal developed on line 176 at the time the EOD signal appeared on line 145. Instead, a signal will be developed on line 176 at a time that is delayed from the point of occurrence of the signal on line 145 when one of three conditions is met. The amount of delay is equal to the time period between the occurrence of the signal on line 145 and the time from this point that it takes for one of the three conditions to occur.

If the ignition event is delayed from the desired or calculated EOD point the circuit will add in an additional dwell time for those coils that are energized for their following SOD point. This added dwell time may be, for example about 1.5 milliseconds. The manner in which this additional dwell time is provided will now be described. Assume that an EOD input signal is applied to gate 175 and that the output signal on line 176 is delayed from the input signal until one of the three above-mentioned conditions is met. When this happens the logic arrangement, including NOR gate 274 and flip-flop 280 causes a high state "1" to be applied to an input of AND gate 282 via line 284. Another input to AND gate 282 is the line 182 which has main clock pulses applied thereto. As previously mentioned, the QB output of flip-flop 203 is another input to AND gate 282. The output of AND gate 282 is connected as an input to OR gate 281. When one of the three above-mentioned conditions are met the signal EOD2 will occur which will reset flip-flop 203. This then results in the ramp counter 200 being clocked via line L1 at the frequency of the main clock 180 instead of at a frequency that is one-third of main clock frequency. Thus, main clock pulses on line 182 are fed into ramp counter 200. The ramp counter is therefore fast clocked and this has the effect of adding in a period of additional dwell time for the following ignition event for the same coil. This should typically over compensate the EOD variation if it is still occurring and therefore the delayed ignition event should only occur for one engine revolution (one ignition event for each coil).

When the AND gate 282 is activated it applies the clock pulses from line 182 to a counter 290 via line 288. When this counter counts up to a value that corresponds to about 500 microseconds the counter applies a signal to flip-flop 280 which is triggered to such a state that the AND gate 282 is opened to terminate the feeding of clock pulses to ramp counter 200. The system is arranged such that the ramp counter 200 has now been loaded with a count that will result in about an additional 1.5 milliseconds of dwell time. It will be appreciated that the ramp counter 200 was loaded by closure of AND gate 282 before the minimum burn time and this loading occurs prior to the time that one-shot OS2 causes the contents of the ramp counter 200 to be loaded into latch 220. In this regard, it should be noted that the time period between the development of the output signal EOD2 signal and the development of the output signal by counter 260, which is applied to line L4 and one-shot OS2, is the same as the time period required to provide an output from counter 290, namely 500 microseconds. Thus, the count applied to ramp counter 200, when AND gate 282 is closed, is added to the count already in counter 200.

The fact that ramp counter 200 starts to count up when an SOD signal occurs and terminates counting when current limit is reached has been previously described. Thus, when a SOD signal occurs on line 158 flip-flop 203 closes gate 202 so that ramp counter 200 is fed with clock pulses at one third clock frequency via OR gate 281 and line L1. When current limit occurs the signal on line 81A causes the gate 202 to open to thereby terminate the feeding of pulses to ramp counter 200. This is due to the cooperation of OR gate OR1 and flip-flop 203. If current limit is not reached the gate 202 nevertheless will be opened to terminate the feeding of clock pulses to ramp counter 200 when an EOD2 signal is applied to OR gate OR1 via line 176. Further, if current limit is not reached, that is when an EOD2 signal terminates the feeding of clock pulses to ramp counter 200, the PLA 204 will develop a CLT signal for register 205 that corresponds to the count attained by ramp counter 200 at the time the EOD2 signal occurred.

In regard to the programmable logic array 204, it should be pointed out that the CLT value that it develops, and which is applied to register 205, is a value that is related to the count attained by ramp counter 200 from SOD until the ramp counter attains its ultimate count value. The PLA 204 will respond to the ramp count in ramp counter 200 caused by counting up when gate 202 applies clock pulses to counter 200 and any additional count provided by the closing of AND gate 282 (fast clocking). Thus, if AND gate 282 is actuated closed PLA 204 will develop a CLT magnitude that is related to the ramp count added to any count loaded into ramp counter due to the closure of AND gate 282. It should be apparent that function generators other than a programmable logic array could be used to develop the CLT signal.

In the description of this invention and in FIG. 2C the indicia RT has been used to define and identify a period of elapsed time that begins when a coil is energized (SOD) and ends when current limit is reached. As has been explained, the system of this invention may operate such that current limit is not reached. When current limit is not reached the ramp counter 200 will nevertheless attain a ramp count value that is related to a ramp time and the system is then controlled by a ramp time that is not RT where RT is specifically defined as the period of time beginning with SOD and ending when current limit is reached.

In regard to dwell time, it will be appreciated from the foregoing description of the invention that dwell time is a function of the magnitude of the count loaded into anti-dwell counter 154. Thus, as the magnitude of the count loaded into anti-dwell counter 154 increases the dwell time increases and as the magnitude of the count loaded into anti-dwell counter 154 decreases dwell time decreases. Thus, as the magnitude of the count loaded into anti-dwell counter 154 increases the SOD signal occurs earlier since the counter 154 does not have to increment or count-up as far to cause the SOD signal to be developed. Conversely, as the count loaded into anti-dwell counter 154 decreases the SOD signal will occur later.

The ignition system has been described in connection with a four cylinder engine. It will be apparent that this invention is applicable to ignition systems for six cylinder engines with suitable modifications to accommodate a six cylinder engine.

The embodiments of the invention in which an exclusive property or privilege is claimed are defined as follows:

1. The method of controlling the dwell time for each primary winding of a distributorless internal combustion engine ignition system for an internal combustion engine that has a plurality of cylinders where the ignition system is of a type that has a plurality of primary windings and wherein means are provided, including secondary winding means, to cause a first pair of spark plugs associated with a first pair of different engine cylinders to be fired when primary current in one primary winding is switched on and off and for causing a second pair of spark plugs associated with a second pair of different engine cylinders to be fired when primary winding current in another primary winding is switched on and off, the primary windings being energized sequentially as a fucntion of engine crankshaft position, the steps comprising, sensing the magnitude of current flowing through each primary winding each time a primary winding is energized and limiting primary winding current to a substantially constant current limit value when primary winding current attains said substantially constant current limit value, each time a primary winding is energized developing an electrical signal RT that represents a time period and wherein the magnitude of the time period RT corresponds to a time period beginning at initiation of primary winding current and ending when primary winding current reaches said substantially constant current limit value, each time a primary winding is energized developing a current limit electrical signal CLT that represents a predetermined time period CLT by selecting one CLT value from a plurality of CLT values as a fucntion of the time period RT, each time a primary winding is energized, storing signal RT and the selected CLT signal that corresponds to a given primary winding that was just energized, retrieving said stored RT and selected CLT signals that correspond to the prior energization of the given primary winding at a point in time just prior to reenergization of said given primary winding and subsequent to the energization of a primary winding other than said given primary winding and then controlling the point in time that said given primary winding is reenergized as a function of the sum of the retrieved RT signal and selected CLT signal corresponding to the prior energization of the given primary winding whereby RT and CLT data collected when a given primary winding is energized and deenergized is stored and later utilized to control the point in the time that said given primary winding is again energized.

2. An ignition system for an internal combustion engine that has a plurality of cylinders that includes a dwell control system for controlling the dwell time for each primary winding of a distributorless internal combustion engine ignition system of a type that has a plurality of primary windings and wherein means are provided, including secondary winding means, to cause a first pair of spark plugs associated with a first pair of different engine cylinders to be fired when primary current in one primary winding is switched on and off and for causing a second pair of spark plugs associated with a second pair of different engine cylinders to be fired when primary winding current in another primary winding is switched on and off, the primary windings being energized sequentially as a function of engine crankshaft position, comprising means for sensing the magnitude of current flowing through each primary winding each time a primary winding is energized and limiting primary winding current to a substantially constant current limit value when primary winding current attains said substantially constant current limit value, means operative each time a primary winding is energized for developing an electrical signal RT that represents a time period and wherein the magnitude of the time period RT corresponds to a time period beginning at initiation of primary winding current and ending when primary winding current reaches said substantially constant current limit value, means operative each time a primary winding is energized for developing a current limit electrical signal CLT that represents a predetermined time period CLT by selecting one CLT value from a plurality of CLT values as a function of the time period RT, means operative each time a primary winding is energized for storing the signal RT and the selected CLT signal that corresponds to a given primary winding that was just energized, means for retrieving said stored RT and selected CLT signal that correspond to the prior energization of the given primary winding at a point in time just prior to reenergization of said given primary winding and subsequent to the energization of a primary winding other than said given primary winding, and means for controlling the point in time that said given primary winding is reenergized as a function of the sum of the retrieved RT signal and selected CLT signal corresponding to the prior energization of the given primary winding whereby RT and CLT data collected when a given primary winding is energized and deenergized is stored and later utilized to control the point in the time that said given primary winding is again energized.

3. The ignition system according to claim 2 where primary winding current is switched on and off by a transistor which is biased into a current limit mode of operation when primary winding current attains said substantially constant current limit value.

4. The ignition system according to claim 2 where the means for developing the electrical signal RT comprises a digital counter and a source of constant frequency clock pulses connected to the counter, the counter being controlled to count clock pulses during a time period from the occurrence of the SOD signal to the time that primary winding current reaches said substantially constant current limit value.

5. An ignition system for an internal combustion engine comprising, an ignition coil having a primary winding and a secondary winding, a spark plug connected to said secondary winding, a means for energizing and deenergizing said primary winding comprising a semiconductor switching means connected to said primary winding that is biased conductive and nonconductive, said semiconductor switching means being biased conductive by a start of dwell signal SOD and nonconductive by an end of dwell signal EOD, said signals being developed in synchronism with operation of said engine, current sensing means for sensing primary winding current, means coupled to said current sensing means for biasing said semiconductor switching means to a current limiting mode when the magnitude of the primary current attains a current limit value, means for developing a signal RT that is a function of the time period between the occurrence of the SOD signal and the point in time where primary current reaches said current limit value, means for controlling the time period between the occurrence of the EOD signal and the SOD signal as a function of the magnitude of said RT signal, a control circuit having an output connected to said semiconductor switching means for at times developing said EOD signal to cause said semiconductor means to be biased nonconductive, means for developing a spark timing signal and for applying said signal to the input of said control circuit, said control circuit including means operative in a first mode for developing said EOD signal substantially when said spark timing signal occurs or in a second mode wherein said EOD signal is developed at a time delayed from the occurrence of said spark timing signal, means for causing said control circuit to operate in said first mode when primary current attains said current limit value prior to the time of occurrence of a spark timing signal, and means for causing said control circuit to operate in said second mode when primary current attains said current limit value subsequent to the time of occurrence of said spark timing signal, said control circuit when operating in said second mode causing said EOD signal to be developed substantially when said primary current attains said current limit value.

* * * * *